J. E. BAINES AND J. W. LATSHAW.
AUTOMATIC DIE HEAD.
APPLICATION FILED AUG. 29, 1918.

1,331,227.

Patented Feb. 17, 1920.
5 SHEETS—SHEET 1.

INVENTOR.
J. E. BAINES.
J. W. LATSHAW.
by D Anthony Ursina
Their Attorney.

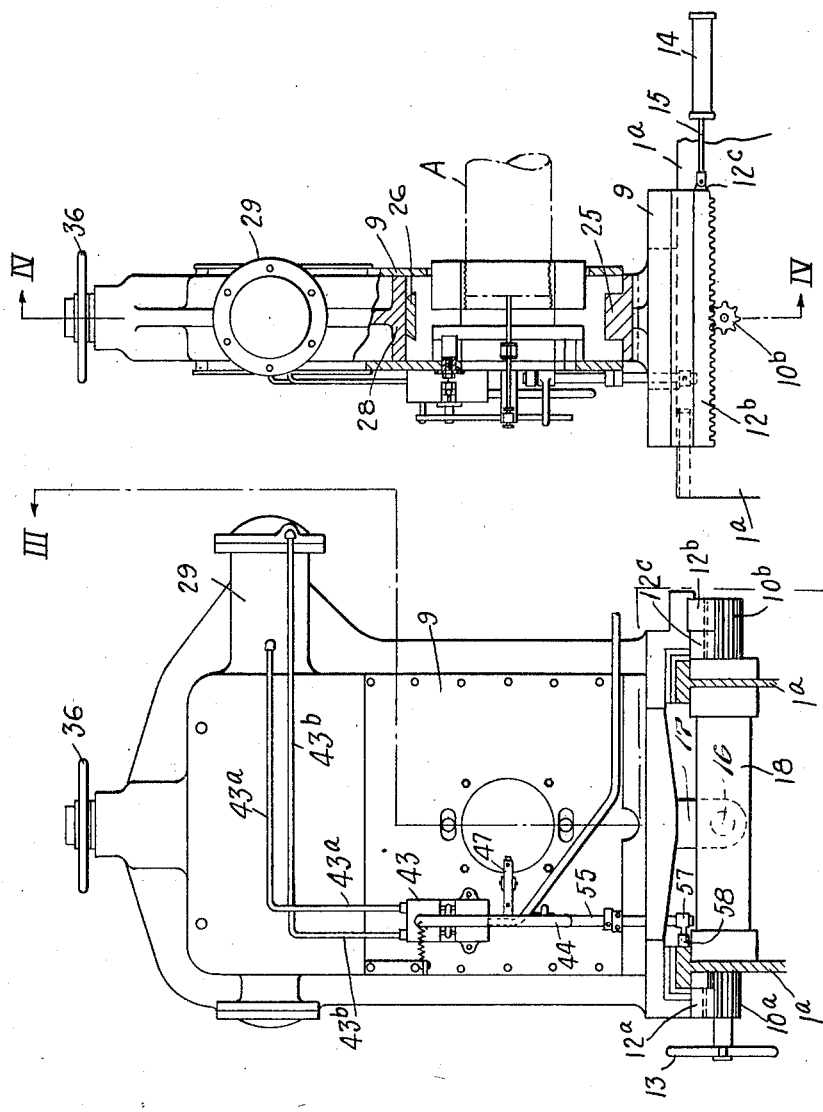

J. E. BAINES AND J. W. LATSHAW.
AUTOMATIC DIE HEAD.
APPLICATION FILED AUG. 29, 1918.

1,331,227.

Patented Feb. 17, 1920.
5 SHEETS—SHEET 3.

INVENTOR.
J. E. BAINES
J. W. LATSHAW.
by D. Anthony Usina
their Attorney.

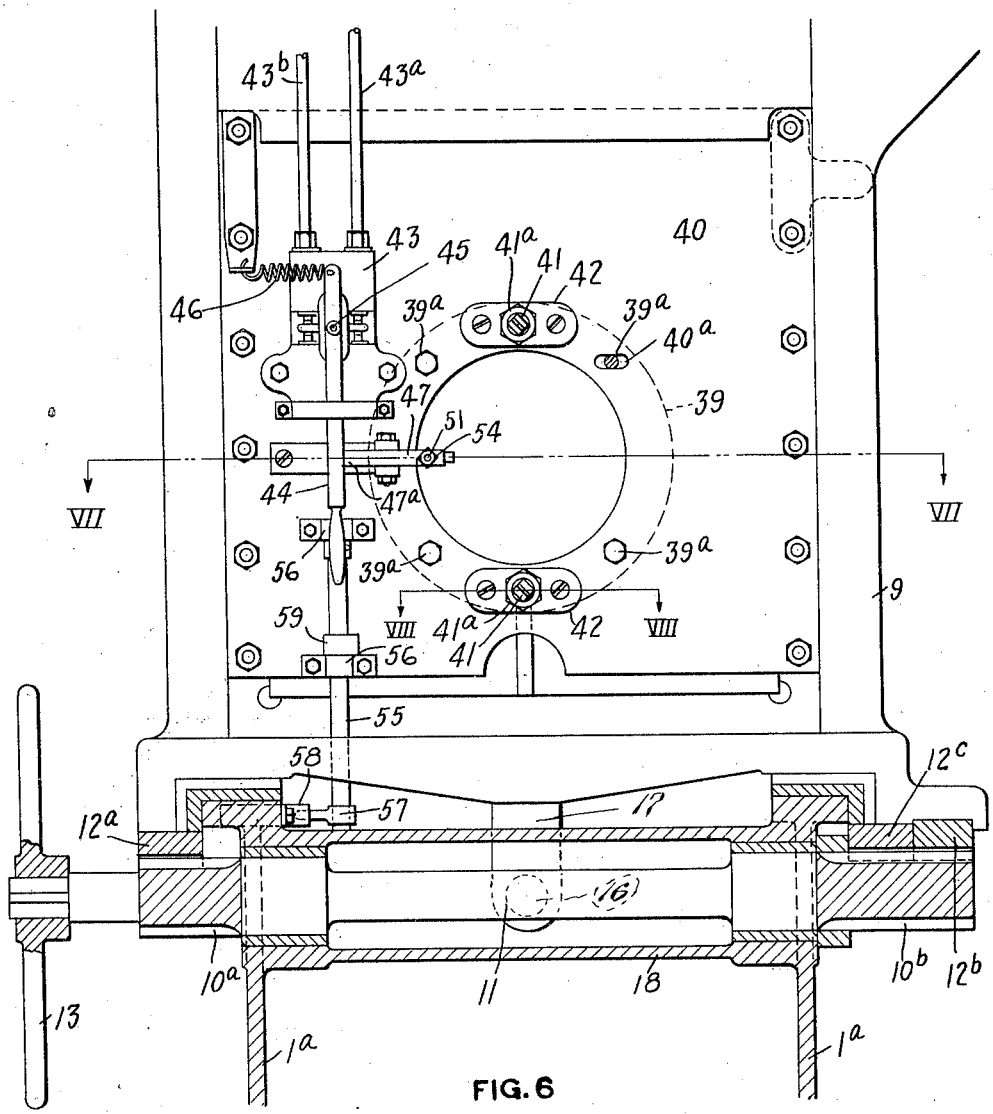

XXXXXXXXXXXXX

UNITED STATES PATENT OFFICE.

JOSEPH E. BAINES AND JOSEPH W. LATSHAW, OF PITTSBURGH, PENNSYLVANIA, ASSIGNORS TO NATIONAL TUBE COMPANY, A CORPORATION OF NEW JERSEY.

AUTOMATIC DIE-HEAD.

1,331,227.   Specification of Letters Patent.   Patented Feb. 17, 1920.

Application filed August 29, 1918. Serial No. 251,964.

*To all whom it may concern:*

Be it known that we, JOSEPH E. BAINES and JOSEPH W. LATSHAW, citizens of the United States, residing in Pittsburgh, Pennsylvania, have invented new and useful Improvements in Automatic Die-Heads, of which the following is a specification.

This invention relates to machines for forming external threads upon the ends of pipes, tubes, shafting and similar work.

Our improved machine consists essentially of a driving member for rotating the pipe and a die holding carriage which is movable toward and away from the work in a direction parallel with the axis of the work. We provide this carriage with a novel form of die holder, automatic mechanism for moving the die holder into and out of operative position, and an improved adjustable member for limiting the extent of inward or closing movement of the dies to enable them to be set for operation on work of varying diameters.

The machine shown and described was designed to operate on pipe and tubing but it is to be understood that we do not limit ourselves to such use as it will be clear to those skilled in the art that many features of the invention are applicable to uses in threading many varieties of cylindrical work. It is to be understood, therefore, the term pipe as used herein is intended to include all classes of cylindrical work.

One object of the invention is to provide a die which can be opened for removing the pipe after it has been threaded, and still be as rigid when closed, as a solid die.

Another object of the invention is to provide a die which can be automatically opened as soon as a predetermined length of thread has been cut upon the pipe end and still be as rigid when closed as a solid die.

Another object of the invention is to provide a die which can be closed to a predetermined position so that the external diameter of the threaded portion of the pipe can be made the same for all pipes of the same size.

A further object of the invention is to provide adjustable means for limiting the closing movement of the dies so that the external diameter of the threaded portion of the pipe can be varied to correspond to varying diameters of the pipe.

A still further object of this invention is to provide a die structure in which all operating movements, such as closing and opening, are performed automatically by power.

Another object of our invention is to combine the various elements and instrumentalities herein described to perform the various functions set forth.

Referring now to the drawings, Figure 1 is a front elevation of a typical form of pipe threading machine equipped with our improved self opening dies.

Fig. 2 is an end elevation of the die holding carriage.

Fig. 3 is a front elevation of the die holding carriage certain parts being shown in section substantially on the line III—III of Fig. 2.

Fig. 6 is an enlarged fragmentary end elevation of a portion of the die holding carriage illustrating the mechanism for automatically controlling the opening and closing the dies.

Figure 8:
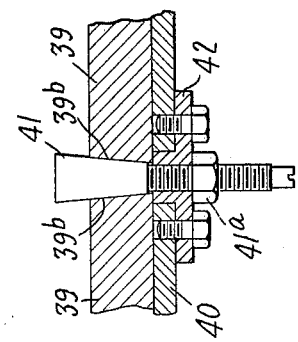
Fig. 8 is a detail section on line VIII—VIII of Fig. 6.
Figure 9:
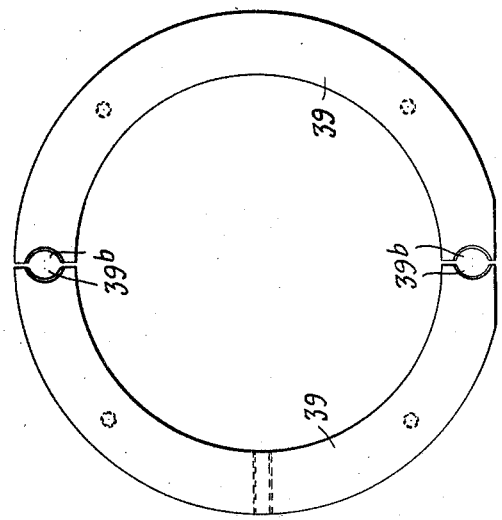
Fig. 9 is a detail of the split ring for adjusting the inward movement of the dies.

In the accompanying drawings, the numeral 1 designates the frame of the machine which rotatably supports the hollow spindle 2. the spindle being driven from the motor 3 through a train of reducing gears 4, 5, 6 and 7 as shown. Mounted on the outer end of the hollow spindle is a known form of universal chuck 8 which can be opened and closed without stopping the machine.

A die-holding carriage 9 is slidably mounted on suitable ways formed on the base portion 1ᵃ of the frame 1 of the machine. This carriage is provided on opposite sides with racks 12ᵃ, 12ᵇ fastened to the carriage to move therewith, the teeth of the racks meshing with the teeth of pinions 10ᵃ, 10ᵇ on opposite ends of the shaft 11. The shaft 11 extends horizontally through the quill 18 on the base portion 1ᵃ of the frame and is provided on one end with a spoked hand-wheel 13 by which the shaft is turned manually to reciprocate the carriage 9. The pinion 10ᵇ has a wide face and also engaging with the teeth of this wide face pinion 10ᵇ is a third rack 12ᶜ which is loosely mounted below the carriage 9 and between one side of the base portion 1ᵃ of the frame and the adjacent rack 12ᵇ which is fastened on one side of the die-holding carriage 9. One end of the rack 12ᶜ is pivotally connected to the piston rod 15 of the fluid pressure cylinder 14 so that when the piston in the cylinder 14 reciprocates the piston rod 15 the rack 12ᵇ will turn the shaft 11 and by turning the shaft and its pinions 10ᵃ, 10ᵇ will reciprocate the carriage 9.

Outward movement of the carriage 9 is limited by a spring stop 16 which is carried by a bracket 17 secured to the underside of the carriage. The stop 16 is adapted to engage with the quill 18 formed on the frame 1.

From the above it will be seen that the carriage may be moved either by hand through the racks 12ᵃ, 12ᵇ and pinions 10ᵃ, 10ᵇ or by power by means of the piston secured on one end of the rod 15, which operates within the cylinder 14 and actuates the rack 12ᶜ. The movement of the piston operating within the cylinder 14 is controlled by a suitable valve 20 which may be conveniently located on the framing of the machine in the position indicated in Fig. 1.

Figure 5:
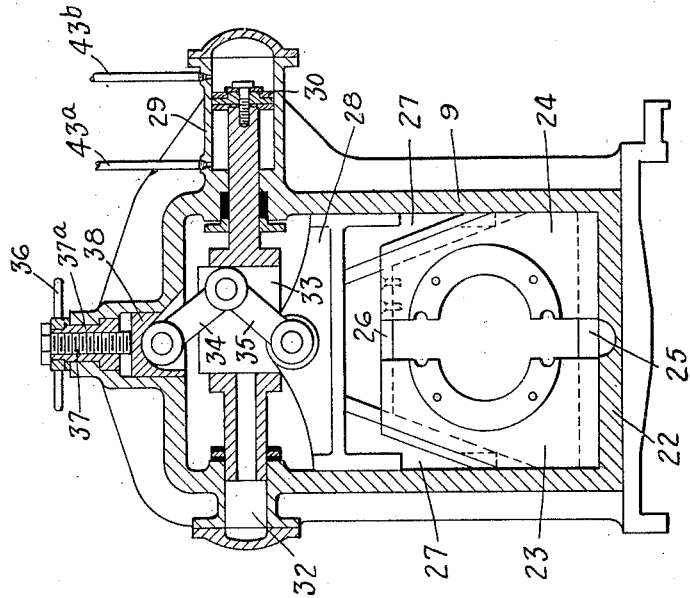
Fig. 5 is a view similar to Fig. 4 showing the dies in open position.
Figure 4:
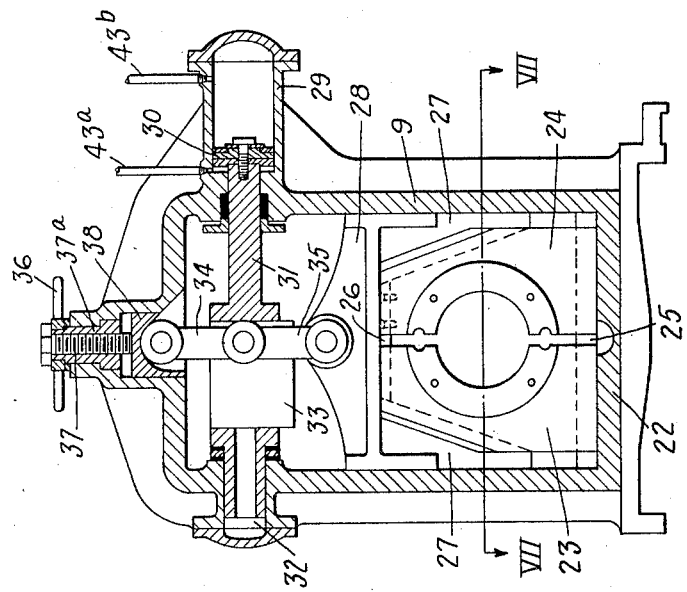
Fig. 4 is a sectional elevation on the line IV—IV of Fig. 3 showing the dies in closed position.

Referring to Figs. 4 and 5, on the lower portion 22 of the housing 9 are slidably mounted the two die holders 23 and 24. Proper alinement of the holders is secured by a feather-key 25, securely fastened to housing 9, and a dove-tailed key 26, secured to the top of section 24 and engaging a slot in holder 23.

Movement of the die holders 23 and 24 to and from one another, for the purpose of opening and closing the die is effected by means of wedges 27—27 carried by a yoke 28. The coacting wedges of the die holders and the yoke are interlocked by the gibbed construction shown in Fig. 7.

This construction insures positive movement of the die holders toward and away from the work and also extreme rigidity of the parts when the dies are in closed position.

A vertical movement of the yoke 28 is effected by means of the piston 30 within the cylinder 29, the yoke being operated by the horizontal piston rod 31, one end of which slides in the guide 32, as shown in Figs. 4 and 5. The piston rod 31 has an enlarged apertured portion in which the cross head 33 slides vertically. The cross head 33 is pivotally connected to the adjacent ends of the toggle arms or lines 34—35 and one end of the line 34 is pivotally connected to the vertically adjustable block 38 to which is secured a screw 37 adapted to coöperate with a nut 37ᵃ. The nut 37ᵃ is adapted to be turned by means of a hand wheel 36 in raising or lowering the block to vary the extent of travel of the yoke 28. The link 35 is connected by one end to and serves to move the yoke 28 when the piston 31 is actuated.

By means of this construction, it is possible to adjust the lateral travel of the die holders 23 and 24 either to compensate for wear or to permit different sizes of dies being used in the holders.

Die holder sections 23 and 24 are positioned by means of a split ring 39, (Figs. 6 to 9) loosely supported by studs 39ᵃ which pass through slots 40ᵃ in the cover plate 40. Tapered pins 41 are interposed between the ends 39ᵇ of the split ring. These pins are carried by special nuts 42, bolted to cover plate 40, and located on the vertical center line of the die, one above, the other below, the center of the die as shown in Figs. 6 and 7.

The split ring 39 limits the inward or closing movement of the die holders, and the tapered pins 41 interposed between the ends of the split ring determine its closed position. Therefore it is clear that by adjusting the position of the tapered pins 41 by turning their threaded shanks in the special nuts 42 the inward travel of the die holders may be readily adjusted for operation on varying sizes of pipe. The tapered pins can be locked in their adjusted positions by suitable jam nuts 41ᵃ.

Figure 7:
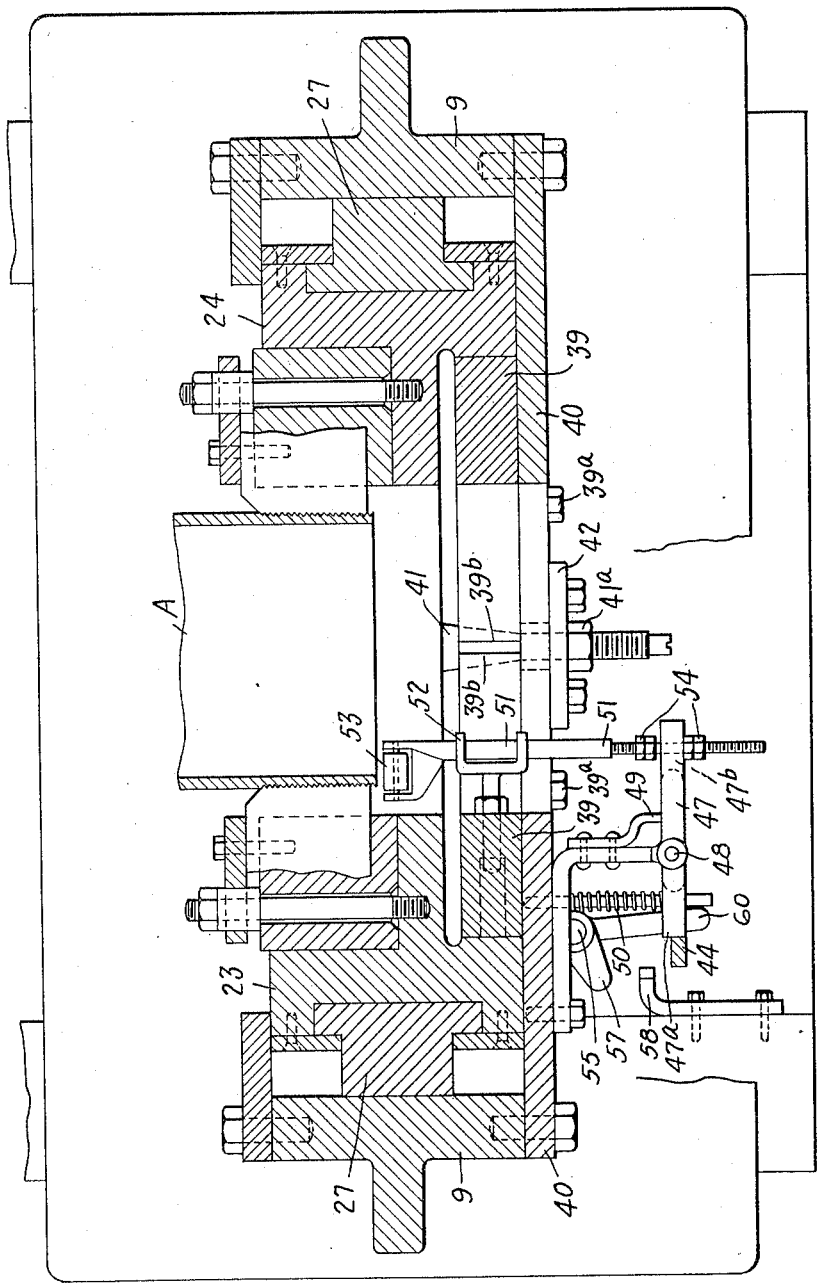
Fig. 7 is a detail horizontal section on the line VII—VII of Fig. 6.

Referring to Figs. 6 and 7, a valve 43 controls the movement of the piston 30. This valve is arranged to be operated either manually or automatically after a predetermined length of thread has been cut on the work. This valve is actuated by a lever 44 fulcrumed at 45 to a suitable lug on the valve casing, a spring 46 acting to return the lever to its normal position. A stop lever 47 pivoted at 48 to a suitable bracket is normally held by a spring 50 against a stop 49. In its normal position the end 47ᵃ of the lever prevents the spring 46 from operating the valve actuating lever 44. For the purpose of moving the lever 47 to trip the valve actuating lever 44, we provide a push rod 51 slidably mounted in a forked bracket 52 secured to the split ring 39. The outer end of the push rod passes through a slot 47ᵇ in the lever and is fitted with adjusting nuts 54 as shown. The inner end of this rod is provided with a roller 53 adapted to be engaged by the forward end of the work being threaded.

In operation a pipe or tube A is fed into the machine to the threading position and the universal chuck 8 is closed in the usual known manner by shifting a suitable lever not shown. At this time the dies are closed and the carriage 9 is advanced until the dies engage the work either by turning the spoked wheel 13 or by operating the valve 20 to admit gas or fluid under pressure to the cylinder 14. Further movement of the carriage is effected by the coaction of the dies and the work.

As soon as a sufficient length of thread has been cut on the work it will engage the roller 53 and push the rod 51 which will rock the lever 47 thereby releasing lever 44 and permitting the spring 46 to act.

This action will permit fluid pressure to flow from valve 43 by way of the pipe 43ᵃ to the inner end of the cylinder 29 thus forcing the piston outwardly and opening the dies to the position in Fig. 5. The operator then releases the universal chuck 8 and the pipe is fed out of the machine. The mechanism for returning the dies to their closed or operative position will now be described.

A vertical shaft 55 is mounted in bearings 56 secured to the cover plate 40 and secured to the lower end thereof is a short lever 57 arranged for engagement with a fixed stop 58 when the carriage is moved to its extreme outer position. An intermediate lever 59 is secured to the shaft 55 to limit its movement through a suitable angle.

To the upper end of the shaft is secured a lever 60 (Fig. 7) adapted to engage the valve lever 44. As thus constructed it will be clear that as the carriage moves away from the work, the lever 57 upon engagement with the stop 58 will rock the shaft 55 thereby causing the lever 60 to operate the valve lever 44.

When it is desired to reset the carriage to starting position, the lever of valve 20 is operated. This admits fluid pressure to the outer end of cylinder 14 thus moving the carriage to the right as viewed in Fig. 1 or away from the work.

Figure 1:
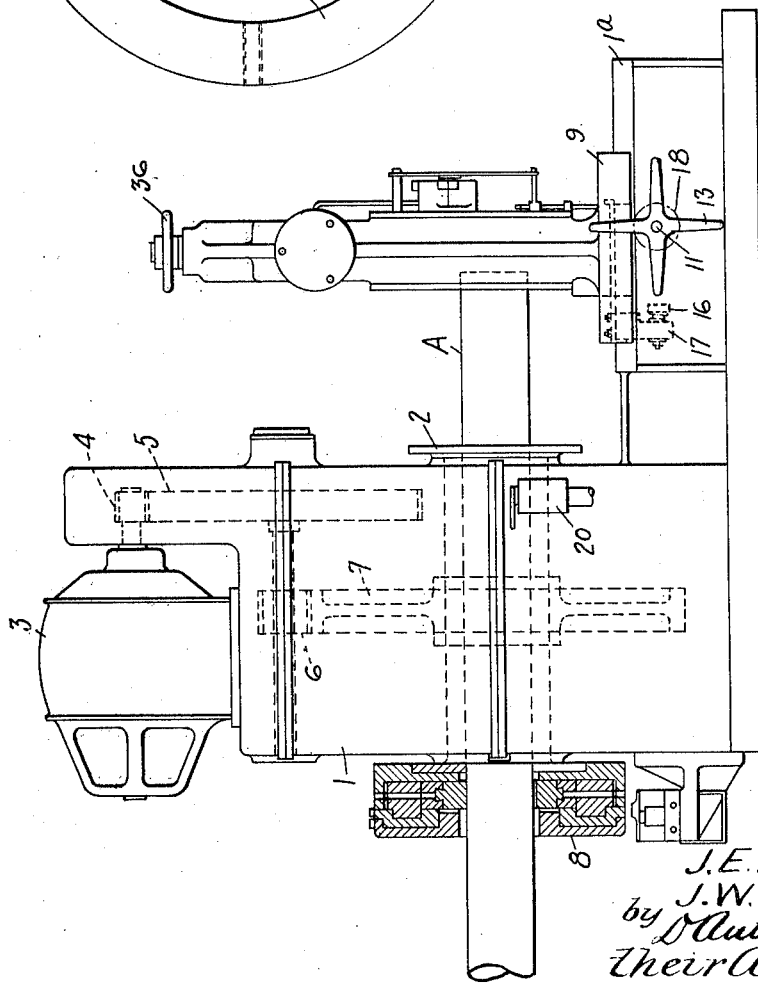

As the carriage approaches the extent of its outward travel the lever 57 comes into engagement with the stop 58 thereby causing the arm 60 to be rocked to throw the valve lever 44. This action admits fluid pressure through valve 33 by way of the pipe 43ᵇ to the outer end of the cylinder thereby forcing the piston 30 inwardly and closing the dies to their operative position as shown in Fig. 1.

The efficiency of this machine is largely increased by the provision of fluid pressure means for opening and closing the dies and makes possible a greater output of work in a given time than has heretofore been possible with this class of machine. The novel method of gaging the length of thread to be cut on the pipe through the use of the automatic control means for opening the dies, also adds to the efficiency of the construction set forth.

By utilizing the construction herein described, extreme rigidity of the die sections is obtained, the interlocked tapered wedges firmly retaining the die holders in threading position so that all the chasers are made to cut an equal amount thereby insuring accurate work. The use of the toggle mechanism in connection with the wedges firmly holds the die holder sections in their working position and thus counteracts any tendency of the die sections to spring apart under working conditions.

The tapered wedges for opening and closing the die sections form a very rigid structure and also permit ample movement insuring a generous clearance for removing the pipe after the threading operation.

While we have described with great particularity the details of the embodiment of the invention herein illustrated, it is not to be construed that we are limited to such a construction and arrangement, as it is obvious to those skilled in the art that numerous structural changes may be made without departing from the spirit and scope of the invention as set forth in the following claims.

What we claim:

1. In a threading machine, a die holding structure, die holders movably mounted in said structure, a movable yoke having inclined surfaces which coact with similar surfaces on said die holder for moving the die holders to their open and closed positions, and automatic mechanical means actuated by fluid pressure for moving said yoke to open and close said dies.

2. In a threading machine, a die holding carriage movable toward and away from the work, die holders movably mounted in said carriage, a movable yoke having inclined surfaces which coact with similar surfaces on said die holder for moving the die holders to their open and closed positions, toggle mechanism operatively connected with said yoke and fluid pressure actuated means for moving said toggle mechanism to open and close the dies.

3. In a threading machine, a die holding carriage movable toward and away from the work, die holders movably mounted in said carriage, a movable yoke having inclined surfaces which coact with similar surfaces on said die holders for moving them to their open and closed positions, means actuated by fluid pressure for moving said yoke and means actuated by contact with the work for controlling the movement in one direction of said last mentioned means to disengage the dies from the work after a predetermined amount of thread has been cut thereon.

4. In a threading machine, a die holding carriage movable toward and away from the work, die holders movably mounted in said carriage, a movable yoke having inclined surfaces which coact with similar surfaces on said die holders for moving the die holders to their open and closed positions, means actuated by the work for controlling the movement in one direction of said last mentioned means to disengage the dies from the work after a predetermined amount of thread has been cut thereon and means actuated by the movement of the die holding carriage for causing said fluid pressure actuated means to move in the opposite direction to effect a closing movement of the dies.

5. In a threading machine, a die holding structure, movable die holders carried thereby, means for moving said die holders to their open and closed positions, a split ring for limiting the closing movement of said die holders and means whereby the split ring can be adjusted to vary the extent of the closing movement of the die holders to position the dies for operation on work of different diameters.

6. In a threading machine, a die holding structure, die holders guided therein, a movable yoke for opening and closing said die holders, toggle mechanism for moving said yoke, and adjustable means whereby the stroke of said toggle mechanism may be varied to position the die holders for operation on work of different diameters.

7. In a threading machine, a die holding structure, die holders guided therein, a movable yoke for opening and closing said die holders, toggle mechanism for moving said yoke, a cylinder, a piston operating therein which is operatively associated with said toggle mechanism, a valve for controlling the supply of fluid to said cylinder and means associated with said valve whereby the valve will operate to admit fluid to one end of said cylinder to cause said piston and associated parts to move said die holders to open position after a predetermined length of thread has been cut on the work.

8. In a threading machine, a die holding structure, die holders guided therein, a movable yoke for opening and closing said die holders, toggle mechanism for moving said yoke, a cylinder, a piston operating therein which is operatively associated with said toggle mechanism, a valve for controlling the supply of fluid to said cylinder, means associated with said valve whereby the valve will operate to admit fluid to one end of said cylinder to cause said piston and associated parts to move said die holders to open position after a predetermined length of thread has been cut on the work, and means for subsequently operating said valve to admit fluid to the other end of said cylinder to cause said piston and associated parts to close said die holders to their operative positions.

9. In a threading machine, means for rotating the work, a movable carriage provided with self opening and closing dies, means actuated by fluid pressure for moving said carriage up to the work, the further movement of the carriage being effected by the coaction of the dies with the work, a fluid pressure actuated piston for opening and closing the dies and means operated by contact with the work for causing the piston to disengage the dies from the work thereby stopping the movement of the carriage.

10. In a threading machine, means for rotating the work, a movable carriage provided with self opening and closing dies, means actuated by fluid pressure for moving said carriage up to the work, the further movement of the carriage being effected by the coaction of the dies with the work, a fluid pressure actuated piston for opening and closing the dies and means operated by contact with the pipe for causing the piston to disengage the dies from the work thereby stopping the movement of the carriage and a fixed stop arranged to coact with the last mentioned means for closing the dies when the carriage approaches the limit of its travel away from the work.

11. In a threading machine, a die holding carriage, means for moving said carriage up to the work, the further movement of the carriage being effected by the coaction of the dies with the work, die holders movably mounted in said carriage, a movable yoke having inclined surfaces which coact with similar surfaces on said die holders for moving them to their open and closed positions, means actuated by fluid pressure for moving said yoke and means actuated by contact with the work for controlling the movement in one direction of said last mentioned means to disengage the dies from the work after a predetermined amount of thread has been cut thereon and means actuated by the movement of the die holding carriage for closing the dies as the carriage approaches the limit of its travel away from the work.

12. In a threading machine, a die holding structure, die holders guided therein, a movable yoke for opening and closing said die holders, toggle mechanism for moving said yoke, a cylinder, a piston operating therein which is operatively associated with said toggle mechanism, and mechanical means for automatically controlling the movement of said piston after a predetermined length of thread has been cut.

In witness whereof we have hereunto signed our names.

JOSEPH E. BAINES.
JOSEPH W. LATSHAW.